United States Patent

[11] 3,610,354

| [72] | Inventor | Bauke S. Sieswerda |
| | | Geleen, Netherlands |
| [21] | Appl. No. | 794,218 |
| [22] | Filed | Jan. 27, 1969 |
| [45] | Patented | Oct. 5, 1971 |
| [73] | Assignee | Stamicarbon N. V. |
| | | Heerlen, Netherlands |
| [32] | Priority | Jan. 25, 1968 |
| [33] | | Netherlands |
| [31] | | 6801106 |

[54] BALANCE
3 Claims, 13 Drawing Figs.

[52] U.S. Cl. ................................................. 177/210, 177/185, 177/212, 177/DIG. 5
[51] Int. Cl. ................................................. G01g 3/14
[50] Field of Search ........................................... 177/185, 210, 212, DIG. 5

[56] References Cited
UNITED STATES PATENTS

| 2,574,395 | 11/1951 | Jack et al. | 177/DIG. 5 |
| 2,631,027 | 3/1953 | Payne | 177/212 X |
| 2,734,735 | 2/1956 | Payne | 177/212 X |
| 3,106,978 | 10/1963 | Cahn | 177/210 |
| 3,186,504 | 6/1965 | Van Wilgen | 177/212 X |
| 3,224,517 | 12/1965 | Cahn | 177/210 |
| 3,305,035 | 2/1967 | Gast | 177/185 |
| 3,404,743 | 10/1968 | Schultz | 177/210 X |

FOREIGN PATENTS

| 1,094,936 | 12/1967 | Great Britain | 177/210 |

Primary Examiner—Richard B. Wilkinson
Assistant Examiner—George H. Miller, Jr.
Attorney—Cushman, Darby & Cushman ABSTRACT: A balance having a rotatably suspended balance arm connected to a horizontally disposed tension wire; the tension wire is mechanically linked to a barrel-shaped coil holder which is rotatably mounted in a casing; a permanent magnet is fixed to the casing to extend within the coil holder; conducting coils are arranged on the exterior of the coil holder to cooperate with the magnets to restore the balance arm to an equilibrium position; the current supplied to the coils to restore the balance arm being a measure of the weight of the object placed on the balance arm.

PATENTED OCT 5 1971
3,610,354
SHEET 1 OF 2
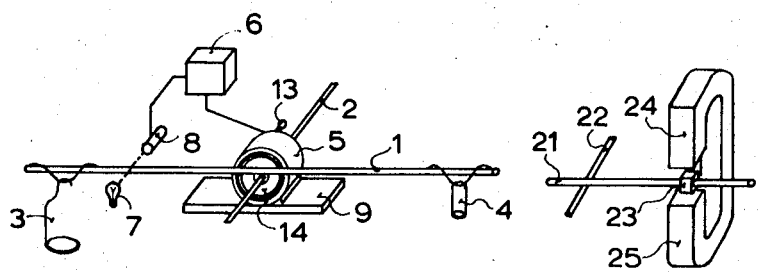
FIG. 1      FIG. 2
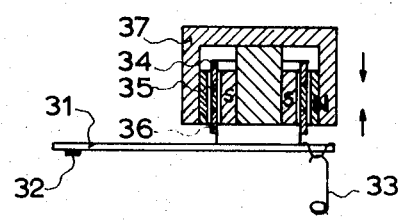 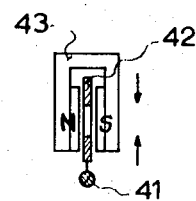
FIG. 3      FIG. 4
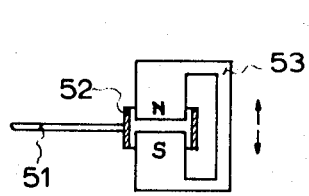 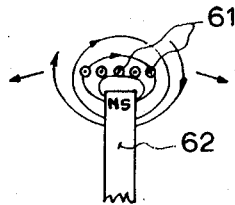
FIG. 5      FIG. 6
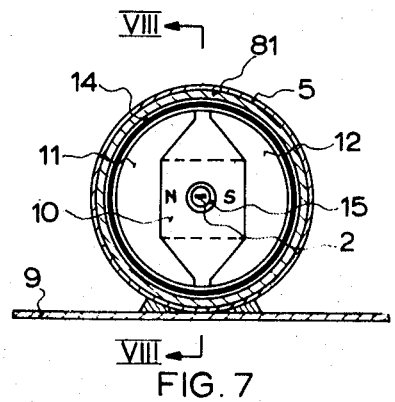 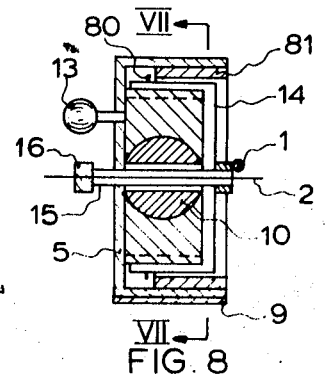
FIG. 7      FIG. 8
INVENTOR
BAUKE S. SIESWERDA
BY Cushman, Darby & Cushman
ATTORNEYS

BALANCE

The invention relates to a balance comprising a balance arm that is rotatably suspended on a horizontal tension wire and a measuring coil by which said balance arm is kept in, or brought into equilibrium. The term "wire" as used in this specification may also be taken to mean a narrow strip.

Although suspensory tension wires offer well-known advantages over knife-edge supports, such as nonfriction, sturdiness and nonwandering of the axis of rotation (every knife-edge support is in principle a roller bearing), this type of suspension has still not found general application.

One of the causes is to be sought in the action of a deflection-proportional torque produced by the twist of the wire. This torque has a stabilizing effect on the balance arm and, in consequence, reduces the sensitivity of the balance.

It is well known that the sensitivity of a balance can be improved by bringing the center of gravity of the balance arm with its accessories closer to the axis of rotation. This is usually done by means of an adjusting nut provided over the axis of rotation. This has the drawback that use is made of the force of gravity, which implies that the apparatus must be placed perfectly level.

The invention provides a solution to the above problem in that it incorporates magnetically coacting members of which at least one is stationary and at least one is connected with the arm, the said members being so disposed in relation to one another that whatever the position of the arm, the arm will be acted upon by a torque which compensates the torsional moment in the tension wire (wires).

It is possible in this manner to obtain an indifferent equilibrium without additional loading of the balance arm and without making use of the force of gravity, under which conditions the maximum profit is derived from the advantages offered by the tension wires.

The invention can be realized in widely different ways which all share the feature that, with the balance arm at equilibrium, the movable member itself is in unstable equilibrium.

A possible embodiment, for example, comprises two interconnected members between which a third member is disposed which is attracted by the other two, the third member being connected with the arm and the other two being stationary, or the other way round.

The two members may be permanent magnets or electromagnets, or be manufactured out of soft iron or the like. In the first two cases the third member may be constructed of soft iron, or consist of a permanent magnet or an electromagnet, while in the third case it may be a permanent magnet or an electromagnet.

The use of electromagnets has the advantage that the magnetic force can be very accurately adjusted to the desired value. Moreover, the mass of the magnet coils may be very small, which is very important when coreless coils are provided on the balance arm.

According to a preferred embodiment, the member connected with the arm consists of a coil which is so disposed near the poles of a magnet acting as the stationary member that, upon energizing of the coil, opposed forces will come to act on the coil whose sum increases with and acts in the same direction as the deflection of the arm.

If the coil is disposed at a point away from the tension wire, the torque exerted on the balance arm by the coil will have a much longer arm than in the event the coil is provided near the tension wire, as the measuring coil usually is. Advantages that can be achieved are a simpler and lighter construction, and a very accurate adjustment.

The coil can now be fitted in an airgap between the poles of a stationary magnet, which gap is disposed tangentially to the tension wire, the whole arrangement being such that, viewed against a vertical cross-sectional plane intersecting the tension wire at a right angle, each of the two borders of the airgap contains a portion of the coil and the forces acting on the parts are directed towards each other.

According as one of the coil parts moves deeper into the gap, the magnetic force acting on said part increases at the same time the other coil part moves further out of the gap, with the result that the magnetic force acting on said part decreases.

In another embodiment the coil is adapted to travel along two opposed poles placed a short distance apart, in such a way that the direction of travel of the coil is perpendicular to the plane of separation between the poles and at least part of the two poles is covered by the coil. The direction in which the current flows through the coil must be such that the forces in the coil parts are directed away from one another. If one part of the coil moves away from the gap, the force acting on said part increases, whereas the other coil part moves towards the gap and the force acting on said part decreases.

Various embodiments can be conceived on the basis of this principle. The coil is preferably made tubular with, e.g. a rectangular or a cylindrical cross section. The airgap may be provided in the coil and be rectangular or disc-shaped. The airgap may also be of annular shape and be enclosed by the coil.

In a special embodiment two opposed coil parts are placed in the plane of the tension wire, parallel to and on either side of said wire, while the poles of the stationary magnet are placed symmetrically with respect to the tension wire and are so shaped that each of the said two coil parts coacts with a pair of poles. The invention will now be elucidated with reference to the drawing.

FIG. 1 represents a balance of a type covered by the invention;

FIG. 2 shows an embodiment in which three magnetically coacting members are arranged on one line, and the two outer ones attract the middle one;

FIG. 3 shows a construction in which a tubular or box-section coil is placed in an airgap and connected with the balance arm;

FIG. 4 shows a flat coil placed in the airgap and connected with the balance arm;

FIG. 5 illustrates a tubular or box-section coil which is adapted to travel along an airgap;

FIG. 6 shows a coil part adapted to travel along a flat magnet;

FIG. 7 is a longitudinal section, perpendicular to the tension wire, through part of a balance with centrally disposed coils;

FIG. 8 is cross section in the plane of the tension wire of the balance, taken over the line VIII—VIII in FIG. 7;

Figure 9:
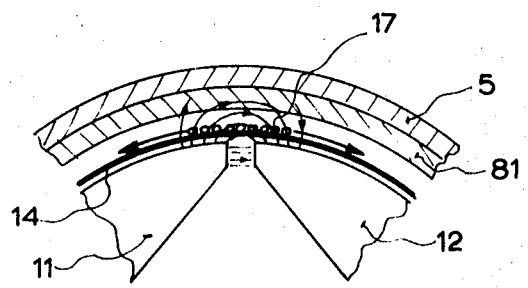
FIG. 9 is an enlarged detail according to FIG. 7.

FIG. 1 shows a microbalance which comprises a balance arm 1 fitted transversally to a tension strip 2. The tension strip is suspended on fixed points (not shown). Arm 1 carries weight attachment 3 and 4. Balance arm 1 in FIG. 1 is connected with a measuring coil (not shown), which coacts with stationary magnet poles. These magnetically coacting members are accommodated in a casing 5; further details of this casing are shown in FIGS. 7–13, and will be discussed later.

A current passed from measuring box 6 through the measuring coil ensures that the balance arm is kept in, or restored to equilibrium. Checking for equilibrium is done by means of a light source 7 and a photosensitive detector 8. The current intensity is a measure of the weight to be measured. The balance is capable of detecting weight differences equal to 0.1 $\mu$g.

The measuring coil need not be placed in a central position i.e. near the tension strip. FIG. 3 shows an example in which the measuring coil is disposed at the end of the balance arm; the tension strip is placed at the other end of the balance arm, so not in a central position.

According to the invention, the stabilizing torsional movements in the tension wires, or strips, and those in the current supply and discharge lines, are compensated by an unstabilizing moment produced by magnetic forces.

In the embodiment shown in FIG. 2 a balance arm 21, which is supported on a tension strip 22, carries an element 23 that is attached near the end thereof, Said element is magnetically attracted in two opposite directions by two fixed members 24 and 25. The members 24 and 25 may be opposed poles of a permanent magnet, in which case element 23 may be made of soft iron, or consist of a permanent magnet whose poles are directed towards the fixed magnet poles, i.e. with a north pole facing a south pole and vice versa. If the balance arm moves out of equilibrium, the distance between members 23 and 24 decreases for example, whereas the distance between the numbers 23 and 25 increases accordingly by, or the other way round. The equilibrium between the forces exerted on member 23 by the elements 24 and 25 is then disturbed and, more particularly, in the sense that the upward force predominates, that is to say, a force acting in the same direction as the deflection.

In the embodiment of FIG. 3 a balance arm 31 is supported at one end on tension strip 32, and at the opposite end provided with a weight attachment 33 and a tubular or box-section coil consisting of three parts 34, 35 and 36. Coil part 35 represents a measuring coil, while the parts 34 and 36 constitute a coil for producing the indifferent equilibrium as meant in the invention. The three-piece coil (34, 35, 36) shown in the drawing is cylindrical and is disposed in an annular airgap between cylindrical pole shoes of a magnet 37.

However, magnet 37 may also be made flat, in which case there are two airgaps, and the coil is rectangular in section, with each of two opposed sides being disposed in one of the gaps.

The currents through the coil parts 34 and 36 flow in opposite directions, and more specifically in such a way that the forces acting on the coil parts are directed towards each other. If the balance arm moves up, the force acting on coil part 36 increases, and that acting on coil part 34 decreases, so that the resultant is directed upwards.

In the embodiment of FIG. 4 a flat coil 42 is disposed in vertical position on the end of balance arm 41. The coil is placed in a flat airgap between the poles of a C-shaped magnet 43. The coil is rectangular in section, and its two opposed sides, shown in cross section in FIG. 4, constitute the active parts, while the two other opposed sides might be regarded as the coil heads. The action is similar to that of the system shown in FIG. 3. In this embodiment the measuring coil is disposed at a different place.

The embodiments shown in FIGS. 5, 6 and 9 are so conceived that the coil travels along two opposed poles parallel to a connecting line between the poles.

Although the coil is one piece, it may yet be distinguished into a coil part that is substantially acted upon by the one pole, and another coil part exposed substantially to the action of the other pole. This implies that the forces acting on the coil are directed away from each other. If the balance arm moves out of equilibrium, the active portion of the one coil part increases whereas the active portion of the other part decreases. Also here the resultant force acts in the same sense as the deflection.

The embodiment of FIG. 5 shows a cylindrical coil 52 disposed on the end of a balance arm 51, the said coil enclosing a disc-shaped airgap between the poles of a C-shaped magnet 53.

In the embodiment of FIG. 6 a coil part 61, schematically represented as a cross section through some turns, travels along the poles of a flat magnet 62. The coil may be constructed and disposed in the same way as coil 17 in the embodiments shown in FIGS. 7–13.

Casing 5 in FIG. 1 is represented on an enlarged scale in FIGS. 7 and 8. It is made of soft iron and is fixed on a base plate 9. Mounted in casing 5 is a cylindrical magnet 10, which is provided with pole shoes 11 and 12 (see also FIG. 9. The position of the magnet with the pole shoes is slightly adjustable by manipulation of a knob 13. Adjustment is done only once, by the manufacturer, so that knob 13 has no permanent use. In the space between the pole shoes 11 and 12 and casing 5 a rotatable barrel-shaped coil holder is disposed (FIGS. 1, 7–10). The base end 14 of the thin aluminum coil holder is connected to balance arm 1. It is fitted with a tubular member 15, which is free to move in an opening through the magnet 10. Tubular member 15 encloses the tension strip 2, and is connected to it by means of a clamp 16 on the free end of the tubular element.

Figure 12:
Figure 13:
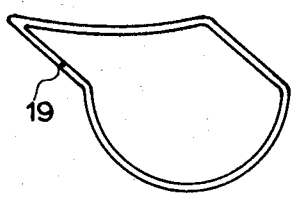

Coil holder 14 carries three coils, viz a coil 17 consisting of a plurality of wires held in position by any suitable means such as an adhesive, which produces the indifferent equilibrium according to the invention, a measuring coil 18 and a damping coil 19. The means for maintaining the wires in position to form the coil 17 may also be used if desired to attach the wires to the coil holder 14. In FIGS. 11, and 12 and 13 the coils are shown separately in the positions in which they are placed on the coil holder 14 in FIG. 10. The damping coil serves to prevent unduly fast deflections and, for that purpose, has been included in a circuit of which the measuring coil also forms part.

Figure 10:
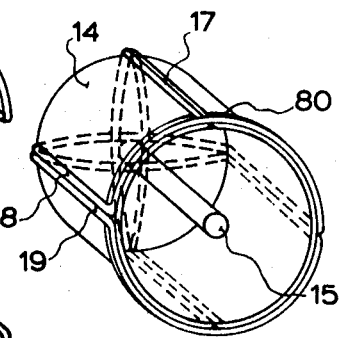
FIG. 10 is the coil holder in FIGS. 7 and 8 provided with a coil according to the invention, a measuring coil and a damping coil, the said coils being separately shown in FIGS. 11, 12 and 13.
Figure 11:
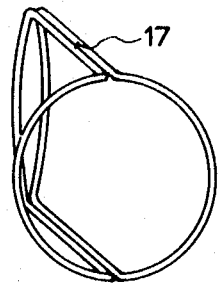

For practical reasons the coil heads are placed on the coil holder 14 behind a raised edge 80 (FIGS 8, 10). After the coil head has been slipped over the pole shoes, a soft iron ring 81 is slipped into casing 5, to narrow the air gap.

The invention is not limited to the embodiments illustrated. It offers a simple and appropriate solution to the problem, with the possibility of very accurate adjustment; in realizing the invention one may choose from an endless range of the varieties, the ultimate choice depending on the requirements to be satisfied.

1. A balance comprising a balance arm fixed at one point intermediate its ends to a barrel-shaped coil holder, said coil holder being rotatably mounted in a casing and having a tension wire disposed to extend therethrough in a direction perpendicular to said balance arm, said tension wire being clamped at a point to said coil holder so that rotation of said balance arm about said wire will impart a torque to said wire, said coil holder having carried on its exterior a plurality of coil elements arranged to extend in planes parallel to and on opposite sides of said tension wire, said casing having fixed thereto a magnet including a pair of poles disposed within said coil holder symmetrically about said tension wire, means for controlling and measuring electric current supplied to said coil elements, said coil elements being arranged to interact with a gap between said poles to restore said coil holder and tension wire to an equilibrium position subsequent to movement of said tension wire out of an equilibrium position.

2. The balance as claimed in claim 1 wherein a damping coil is provided on said coil holder to damp the movement of said coil holder.

3. The balance as claimed in claim 1 wherein a photoelectric sensor is provided to detect movement of said balance arm out of equilibrium position and to actuate said current controlling means to supply current to said coil elements to restore said balance arm to said equilibrium position.